United States Patent [19]
Krautmann

[11] 3,918,164
[45] Nov. 11, 1975

[54] MEASURING DEVICE HAVING REMOTE INDICATING MEANS

[76] Inventor: Edmund J. Krautmann, 403 S. Washington, Chillicothe, Mo. 64601

[22] Filed: Aug. 10, 1972

[21] Appl. No.: 279,498

[52] U.S. Cl............. 33/143 C; 33/174 D; 33/178 C
[51] Int. Cl.²......................................... G01B 5/02
[58] Field of Search.......... 33/143 C, 174 D, 178 R, 33/178 C, DIG. 2; 254/93 HP, 93 PH, 93 R; 128/220, 237

[56] References Cited
UNITED STATES PATENTS

| | | | |
|---|---|---|---|
| 1,713,344 | 5/1929 | Lewis | 254/93 HP |
| 1,912,618 | 6/1933 | Bryant | 33/178 C |
| 1,953,498 | 4/1934 | Pieri | 33/174 D |
| 2,241,451 | 5/1941 | Fist | 33/174 D |
| 2,341,278 | 2/1944 | Long | 254/93 H |
| 2,456,806 | 12/1948 | Wolffe | 33/174 D |

FOREIGN PATENTS OR APPLICATIONS

| | | | |
|---|---|---|---|
| 509,718 | 7/1939 | United Kingdom | 33/178 C |
| 913,255 | 12/1962 | United Kingdom | 33/178 C |

*Primary Examiner*—John W. Huckert
*Assistant Examiner*—Stuart S. Levy
*Attorney, Agent, or Firm*—Rogers, Ezell & Eilers

[57] ABSTRACT

This invention relates to a measuring device having remote reading means comprising a recorder and a receiver each having a piston and cylinder combination defining a hydraulic chamber, the chamber being interconnected by means of a flexible cable such that operable movement of one of the pistons produces corresponding movement of the other piston. The recorder has a measurement indicator associated therewith which gives a reading directly proportional to the receiver's piston extension.

8 Claims, 5 Drawing Figures

MEASURING DEVICE HAVING REMOTE INDICATING MEANS

BACKGROUND AND SUMMARY OF THE INVENTION

This invention generally relates to a hydraulic measuring device and specifically one for use in measuring the dimensions of parts that are not easily accessible, such as the internal pelvic dimensions of an animal, by providing remote means for reading the dimensions. The device includes a recorder portion and a receiver portion each comprising a cylinder and piston combination defining a hydraulic chamber. The hydraulic chambers of the recorder and receiver are interconnected by means of a flexible hydraulic cable, such that operable movement of one of the pistons produces corresponding movement of the other piston. The recorder has a measuring scale which indicates the position of its piston relative to its cylinder, and which is also a measurement of the receiver's piston extension. The receiver has one butting surface associated with its cylinder and another associated with its piston that can be made to abut surfaces of a part, the dimensions of which are to be measured. In this manner the measurement reading is made remote from the part itself which is essential in some applications.

Hence, it is a general object of this invention to provide a measuring device wherein the measurement readings are made remote from that portion of the device sampling the measurement, and wherein measurements of parts not easily accessible can be made quickly, easily and accurately.

This and other objects of the invention will become apparent in referring to the drawing and specification accompanied herewith.

Figure 1:
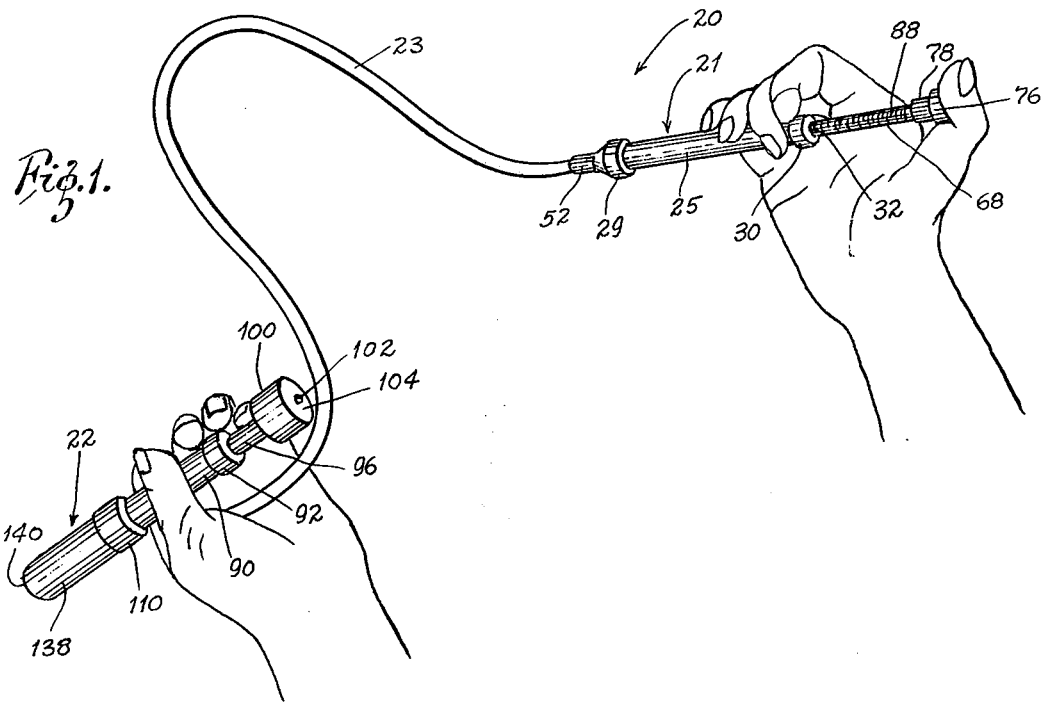
FIG. 1 is an isometric view of the measuring device of this invention as held for operation.
Figure 2:
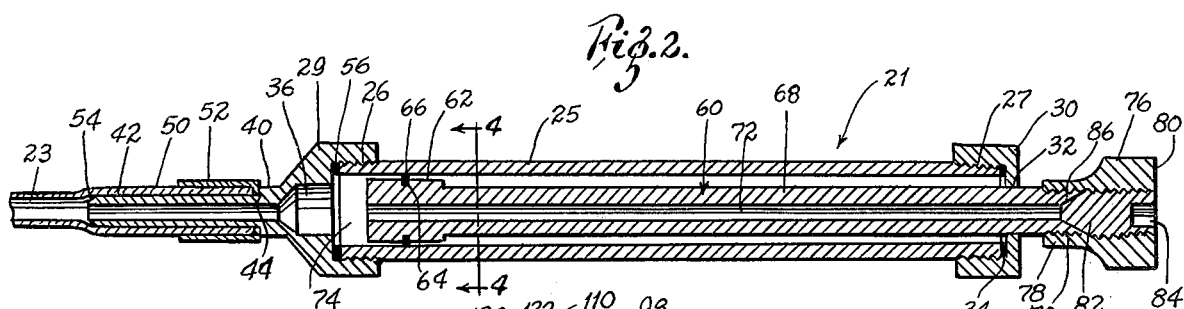
FIG. 2 is generally a longitudinal sectional view of the recording unit of this invention.
Figure 3:
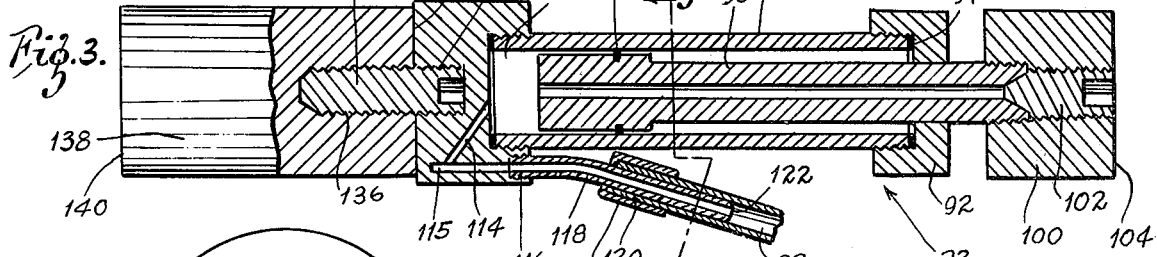
FIG. 3 is generally a longitudinal sectional view of the receiver unit of this invention.
Figure 5:
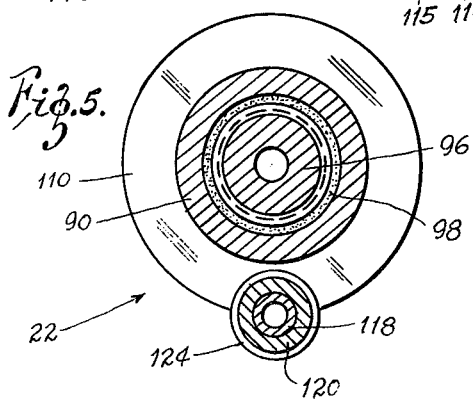
FIG. 5 is an enlarged view in section taken generally along the line 5—5 of FIG. 3.
Figure 4:
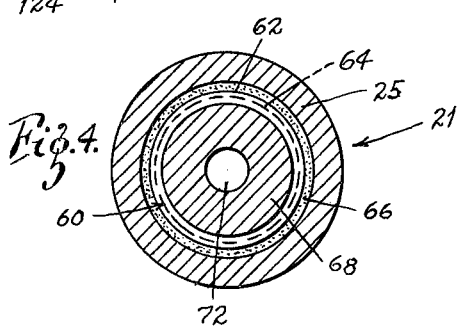
FIG. 4 is an enlarged view in section taken generally along the line 4—4 of FIG. 2.

DETAILED DESCRIPTION OF A PREFERRED EMBODIMENT:

In the drawing there is shown a measuring device 20 of this invention including a recorder 21 and a receiver 22 connected by a flexible hydraulic line or tube 23 of suitable material such as Teflon (polytetrafluoroethylene), and preferably having a braided steel jacket to prevent kinking and ballooning.

The recorder 21 comprises a relatively long cylinder 25 externally threaded at each of its ends 26 and 27 for receiving internally threaded caps 29 and 30, respectively. The cap 30 has an opening 32 axially aligned with the cylinder 25. A washer 34 is seated in the base of the cap 30 for engaging the end of the cylinder 25. The cap 29 has an internal chamber 36 that is axially aligned and communicates with the inner chamber of the cylinder 25. Externally the cap 29 tapers rearwardly and inwardly into a tubular portion 40 having a mandrel portion 42 of reduced external diameter defining an annular shoulder 44. One end 50 of the hydraulic line 23 fits over the mandrel portion 42 and is secured thereon by means of a locking sleeve 52. The end of the mandrel portion 42 is tapered as at 54 for ease in pushing the tube over the mandrel. Hence, as can be seen, the inner chamber of the cylinder 25 communicates with the inner chamber of the tube 23 by way of the chamber 36 of the cap 29 and the internal chamber of the tubular mandrel 42. A washer 56 is seated at the base of the cap 29 for sealingly engaging the end of the cylinder 25.

A piston 60 has an enlarged head portion 62 with an annular groove 64 which receives an O-ring 66 of rubber or other suitable material which sealingly engages the inner wall of the cylinder 25. The piston 60 also has a shank portion 68 which extends through the opening 32 in the cap 30 and terminates in an externally threaded end 70. The piston 60 is tubular having an internal chamber 72 which opens into a cylinder chamber 74 forward of the O-ring 66. An internally threaded knob 76 has a neck portion 78 which screws onto the threaded end 70 of the piston 60, and an end surface 80. An externally threaded plug 82 having an Allen socket 84 or the like and a conical tapered end 86 is screwed into the end of the knob 76 such that its tapered end 86 sealingly engages a mating tapered surface at the end of the piston shank 68, thereby retaining hydraulic fluid within the chamber 72. The shank of the piston 60 has scale markings 88 that indicate the position of the piston 60 relative to the cylinder 25, and as will be described, the extension of the receiver 22.

The receiver 22 is similar in many respects to the recorder 21, it having a cylinder 90, end cap 92 and washer 94, piston 96 and O-ring 98, and knob 100 and plug 102 basically similar to the cylinder 25, cap 30, washer 34, piston 60, O-ring 66, knob 76, and plug 82 of the recorder 21. It will be noted that the dimensions of these parts in the receiver are somewhat different from those in the recorder but that they are basically of the same design and function in the same manner. For example, the piston 60 is of smaller diameter and longer than the piston 96 so that for a given movement of the piston 96, the piston 60 moves a correspondingly greater distance. Also, the knob 100 has a relatively flat butting surface 104 which is of greater diameter than the end surface 80 of the recorder to insure proper abutment against the selected parts to be measured.

The receiver 22 has a knob 110 that engages the other externally threaded end of the cylinder 90 to define with the wall of the cylinder 90, piston 96, and the O-ring 98 a chamber 112. The end cap 110 has passages 114 and 115 that connect the chamber 112 to an internally threaded socket 116 that receives the threaded end of a tubular mandrel 118. The other end 120 of the tube 23 fits over the mandrel 118 as assisted by its tapered end 122, and is secured thereabout by means of a locking sleeve 124.

Hence, the chamber 74 of the recorder 21 is connected to the chamber 112 of the receiver 22 by way of the chamber 36, the mandrel 42, the flexible tube 23, the mandrel 118, and the passages 115 and 114.

The cap 110 has a relatively flat butting surface 130 and a threaded socket 132 for receiving one end of a threaded stud 134. The other end of the stud 134 fits into a threaded socket 136 of an extension member 138 having a relatively flat butting end surface 140. The extension member 138 can therefore be attached or removed as needed depending on the size of the dimension to be measured.

Operation

All of the hydraulic chambers, including the chamber 72 of the piston 60, the chambers 74 and 36, the mandrel 42, the flexible tube 23, the mandrel 118, the passages 115 and 114, the chamber 112, and the chamber of the piston 96, are filled with suitable hydraulic fluid. It has been found that castor oil serves very well for this purpose. These chambers are filled by removing the plugs 82 and 102, filling the chambers, insuring that there is no air or other gases in the system, and replacing the plugs to lock in the hydraulic fluid after the device is suitably calibrated. Calibration can be accomplished by filling the chambers with hydraulic fluid with both pistons fully extended, and then, after securing the plug 82 tightly in place, and the plug 102 only loosely in place, depressing the piston 60 causing fluid to escape past the plug 102 until the piston 60 indicates a reading on its shaft corresponding to the fully extended length of the receiver 22. The piston 60 is held at this reading while the cap 102 is securely tightened.

As can be seen, depression of either one of the pistons produces an extension of the other so that the position of the piston 60 relative to its cylinder is a measurement of the overall length of the receiver 22 between its butting surfaces.

To illustrate the operation of the device of this invention, its use will be described in measuring the pelvic dimensions of cattle.

With the animal properly restrained and with the recorder 21 held in the right hand and the receiver 22 in the left and with the piston 96 of the receiver collapsed, the butting surface 130 or 140 of the receiver is inserted through the animal's anal sphincter and directly forward beyond the pelvic inlet. The receiver is then shifted to a transverse position and the butting surface 130 or 140 directed against the left shaft of the ilium. The butting surface 104 is then moved against the right shaft of the ilium and the recorder piston firmly depressed until the receiver spans the widest horizontal diameter of the pelvis. This is most easily accomplished by playing the butting surfaces forward and back and up and down until the maximum diameter is found. The horizontal pelvic diameter is read directly on the shaft of the recorder piston.

To measure the vertical dimension of the pelvis, the receiver piston is collapsed by pushing it against the right shaft of the ilium while relaxing the pressure on the recorder piston. The butting surface 104 of the receiver is set on top of the pubic spine and the butting surface 130 or 140 directly upwardly and a little forwardly to a position under the sacrum. As firm piston pressure is applied with the recorder, the receiver is again played back and forth for the smallest vertical dimension. The measurement is read off the recorder piston shaft.

Hence, there has been described a novel hydraulic measuring device for measuring the dimensions of parts which have only limited accessibility by means of remote readings.

Various changes and modifications may be made in this invention as will be readily apparent to those skilled in the art. Such changes and modifications are within the scope and teaching of this invention as defined by the claims appended hereto.

What is claimed is

1. A hydraulic measuring device for measuring the pelvic dimensions of cattle comprising a receiver having an elongated cylinder and elongated piston extending from one end of the cylinder, the piston and cylinder defining a first chamber therebetween for receiving hydraulic fluid, the receiver being dimensioned to grasp in the palm of one hand with the fingers curled around its sides and further dimensioned to fit end first along with the hand in which it is held through the anal sphincter of the animal, the end of the cylinder opposite the piston defining a first butting surface and the end of the piston opposite the cylinder defining a second butting surface, a recorder having a piston and cylinder combination defining a second chamber therebetween for receiving hydraulic fluid, flexible tube means connected between the recorder and the side of the receiver and communicating the first chamber with the second chamber, whereby movement of one piston relative to its cylinder produces movement of the other piston relative to its cylinder, and measurement indicating means associated with the recorder and responsive to recorder piston position for indicating the distance between butting surfaces of the receiver, the flexible tube being of sufficient length to extend through the anal sphincter of the animal with the receiver held in one hand in position inside the animal for measuring its pelvic dimension and the recorder located outside the animal, whereby with the receiver properly positioned for making pelvic measurements, the recorder is easily accessible for remote operation of the receiver and direct measurement of the distance between the butting surfaces of the receiver.

2. The device of claim 1 wherein the recorder cylinder and piston are elongated with the piston extending from one end of the cylinder, the recorder being sized to fit in the palm of the other hand with the fingers of that hand curled around its sides and the free end of the piston readily engageable with the thumb of said other hand for depression relative to the cylinder.

3. The hydraulic measuring device of claim 2 wherein the measurement indicating means is a scale located along the side of the recorder piston.

4. The device of claim 1 wherein the portion of the tube nearest the receiver extends from the receiver in a direction away from the butting end of the receiver cylinder for easy entrance to the receiver with its cylinder butting end first through the anal sphincter.

5. The device of claim 4 wherein the end of the receiver cylinder through which the piston extends defines an annular shoulder surrounding the piston, the flexible tube means being connected at the annular shoulder, and further comprising passages within the receiver cylinder connecting the flexible tube means with the first chamber.

6. The hydraulic measuring device of claim 1 wherein the recorder piston is of smaller diameter than the receiver piston, whereby movement of the receiver piston produces a correspondingly greater movement of the recorder piston.

7. The hydraulic measuring device of claim 1 wherein both pistons are tubular to define longitudinal passages therethrough each of which communicates at one end with its respective chamber and further comprising removable seal means for sealing the other ends of the piston passages.

8. The hydraulic measuring device of claim 1 wherein the flexible tube is made of polytetrafluoroethylene and is covered with a braided steel jacket.

* * * * *